(12) United States Patent
Peterson et al.

(10) Patent No.: US 6,761,634 B1
(45) Date of Patent: Jul. 13, 2004

(54) ARCADE TABLE

(75) Inventors: David L. Peterson, East Greenwich, RI (US); A. Franklin La Barbara, Jr., Rumford, RI (US)

(73) Assignee: Hasbro, Inc., Pawtucket, RI (US)

( * ) Notice: Subject to any disclaimer, the term of this patent is extended or adjusted under 35 U.S.C. 154(b) by 314 days.

(21) Appl. No.: 09/874,959

(22) Filed: Jun. 7, 2001

(51) Int. Cl.[7] .................................................. A63F 9/24
(52) U.S. Cl. .......................................... 463/30; 273/236
(58) Field of Search ............................... 463/1, 30, 31, 463/32, 35, 46, 47; 273/236, 237, 238, 309

(56) References Cited

U.S. PATENT DOCUMENTS

| 3,843,132 | A | * | 10/1974 | Ferguson ..................... 273/238 |
|---|---|---|---|---|
| 4,341,385 | A | | 7/1982 | Doyle et al. |
| 4,545,582 | A | | 10/1985 | Andrews |
| 5,082,286 | A | | 1/1992 | Ryan et al. |
| 5,188,368 | A | | 2/1993 | Ryan |
| 5,462,281 | A | | 10/1995 | Gaito et al. |
| 5,848,788 | A | | 12/1998 | Hess |
| 5,853,327 | A | * | 12/1998 | Gilboa ......................... 463/39 |
| 5,953,686 | A | | 9/1999 | Piernot et al. |
| 6,102,397 | A | * | 8/2000 | Lee et al. ..................... 273/238 |

* cited by examiner

*Primary Examiner*—Kim Nguyen
(74) *Attorney, Agent, or Firm*—Fish & Richardson P.C.

(57) ABSTRACT

An interactive game includes a playing surface defining playing positions, a display operable to display a visual game image on the playing surface, a sensor operable to optically detect a playing piece placed on the playing surface, and a game controller connected to the sensor and the display. The game controller creates the game image on the display and alters the game image in response to a location or orientation of the playing piece on the playing surface.

43 Claims, 6 Drawing Sheets

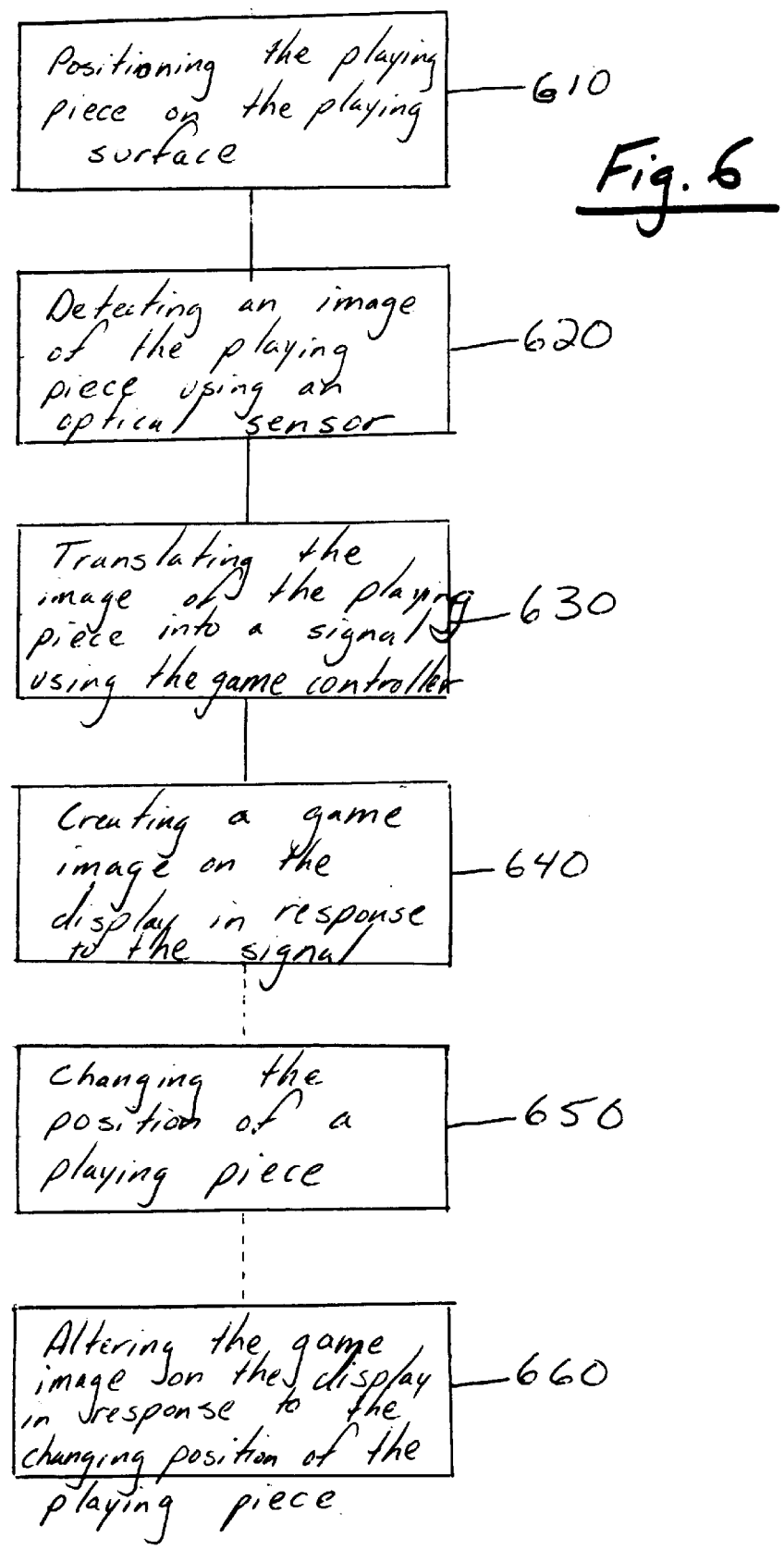

ARCADE TABLE

TECHNICAL FIELD

This invention relates to interactive games.

BACKGROUND

Interactive games include games that respond to the input and actions of a game player. For example, in an interactive game of chess, the movement of a playing piece by one player may cause a computer acting as an opponent to respond by moving another playing piece. Interactive games also may provide visual and audio effects based on the state of the game or in response to input from the players.

SUMMARY

In one general aspect, an interactive game includes a playing surface defining playing positions, a display operable to display a visual game image on the playing surface, a sensor operable to optically detect a playing piece placed on the playing surface, and a game controller connected to receive information from the sensor, configured to generate signals for use in creating the game image using the information from the sensor, and connected to the display to provide the signals to the display. The game controller causes the display to alter the game image in response to a location or orientation of a playing piece on the playing surface.

Implementations may include one or more of the following features. For example, the sensor may be operable to optically detect a foreign object in its field of vision and the game controller may alter the game image upon detection of the foreign object.

The interactive game may include a frame secured to the playing surface. The frame may be attached to a table, or may include a table.

The interactive game may include playing pieces that may be of different types. The playing pieces may include playing cards, tokens, vehicles, or figurines.

The display may be implemented using, for example, a projector, a cathode ray tube, or a liquid crystal display. The sensor may include, for example, a digital camera, a laser, a bar code reader, or a tag reader. In some implementations, a tag writer may be employed to update the status of game tokens.

The game controller may be a computer configured to use an optical character recognition system or machine vision technology. The interactive game may include a speaker and/or a microphone connected to the game controller. The game controller may be configured to emit sound in response to the location or orientation of a playing piece on the playing surface. Additionally, or alternatively, by using the microphone, the game controller may alter the game image in response to a sound. The game controller also may be configured to send a control signal to another device in response to a location or orientation of the playing piece on the playing surface. For example, the game controller may send the control signal to another toy, to a computer, or to audio equipment. The game controller also may be configured as an artificially intelligent opponent to a human player.

The interactive game provides an engrossing, interactive experience for one or more players. By altering the game image upon movement of a playing piece to another position, and by other interactive features, the players may stay more involved and find the game experience more enjoyable.

Implementations of the above features may include methods, systems and/or computer software. Other features and advantages will be apparent from the description, the drawings, and the claims.

DESCRIPTION OF DRAWINGS

FIG. 6 is a flow chart of steps of playing an interactive game.

Like reference symbols in the various drawings indicate like elements.

DETAILED DESCRIPTION

Figure 1:
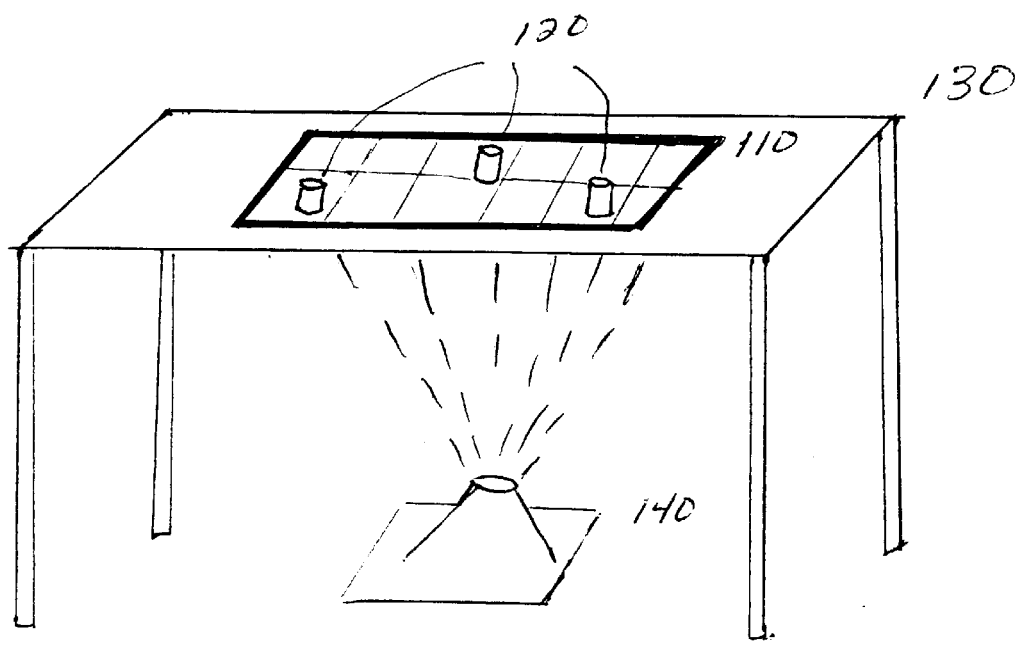
FIG. 1 is a perspective view of an interactive game that includes playing surface, playing pieces, a table, and a projector.

FIG. 1 shows an interactive game 100 with a playing surface 110, playing pieces 120, a table 130, and a projector 140. The playing surface 110 may be a transparent board made of a material such as glass or plastic. The playing surface also may have etched or printed patterns to define the game boundaries. In other implementations, the playing surface 110 may be the surface of a liquid crystal display (LCD) or cathode ray tube (CRT) monitor.

As shown in FIG. 1, the playing pieces may be figurines. The figurines may have different physical features representing different types of playing pieces 120. In other implementations, the playing pieces may be game tokens or playing cards.

As shown in FIG. 1, the table 130 may include a square top supported by legs. The top 130 may have a cut-out area structured and arranged to define the perimeter of the playing surface. The playing surface may be connected to a frame (not shown) that supports the playing surface and connects to the table 130. The top may be made of plastic, glass, metal, wood, or one or more other rigid materials. The top 130 may have another shape, such as a circle, an octagon, or a triangle. The table 130 may be structured and arranged for use in an amusement arcade, and may include enclosed sides that define a cabinet and coin insert and coin return slots.

Figure 2:
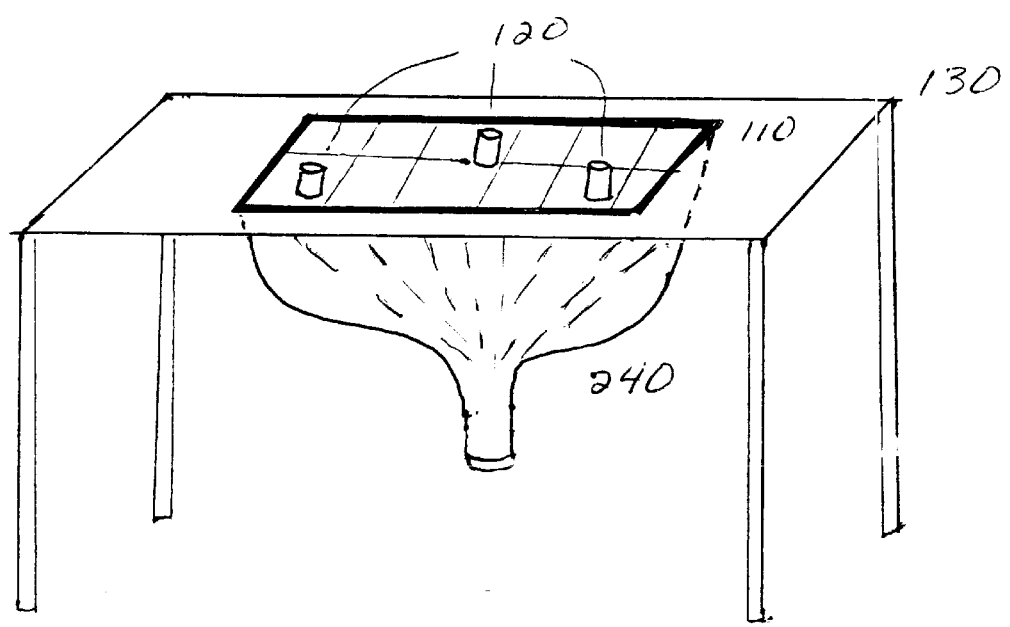
FIG. 2 is a perspective view of an interactive game that includes a playing surface, playing pieces, a table, and a CRT display.
Figure 3:
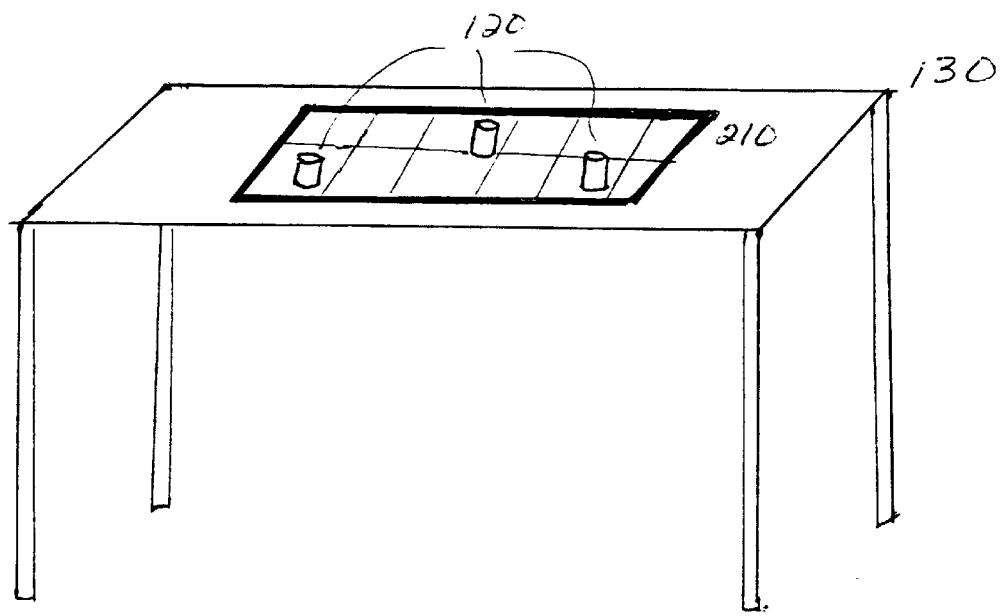
FIG. 3 is a perspective view of an interactive game that includes a playing surface, playing pieces, a table, and an LCD display.

As shown in FIG. 1, the display 140 may include a projector that is positioned under the table to project an image onto the playing surface 110. In another implementation, as shown in FIG. 2, the projector 140 may be replaced by a CRT monitor 300. In yet another implementation, as shown in FIG. 3, the projector 140 may be replaced by an LCD 300, which may use, for example, active matrix or polysilicon technology. In other implementations, the projector 140 may use digital light processing (DLP) or light valve technology.

Figure 4:
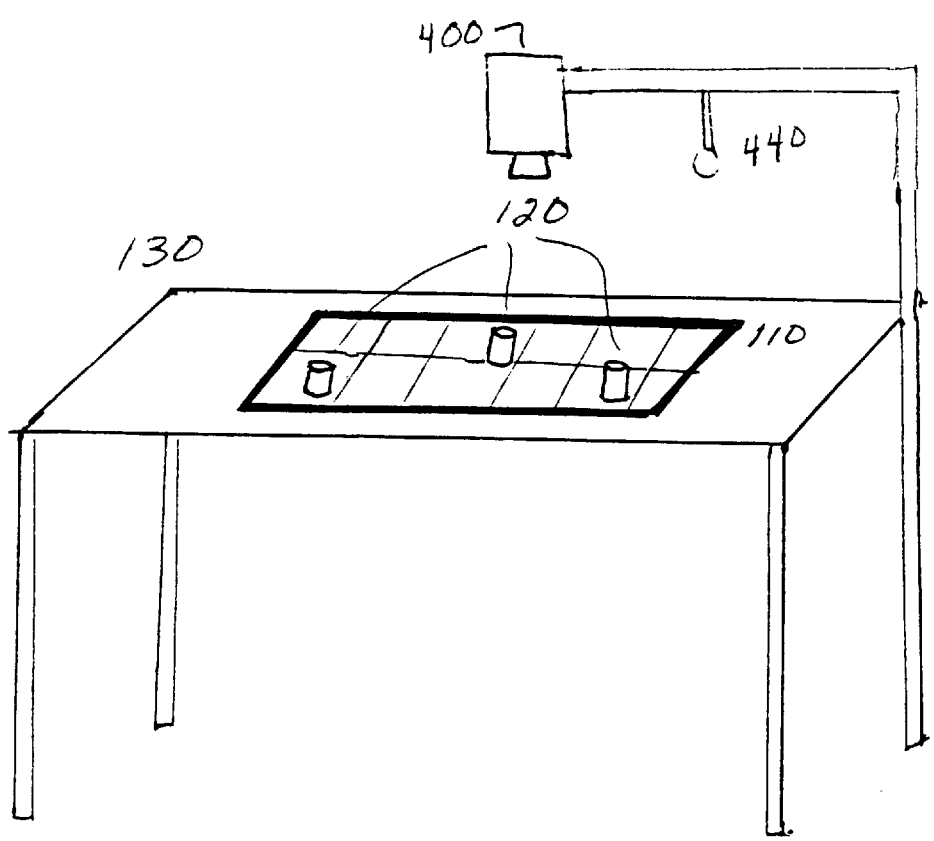
FIG. 4 is a perspective view of an interactive game that includes a playing surface, playing pieces, a table, and a camera.

As shown in FIG. 4, the interactive game may include a sensor 400, such as a digital camera. The camera may be configured to obtain an image of the playing pieces 120 relative to the playing surface 110 to acquire the game state. Other types of optical sensors may be used in addition to or as an alternative to the sensor 400. For example, other sensors may include a laser, a tag reader, or a bar code reader for detection and recognition of playing pieces 120 in conjunction with positioning the playing pieces 120 on the playing surface 110. This permits the interactive game 100 to obtain additional information about the playing piece 120 prior to detecting the position and orientation of the playing piece 120 with the camera.

Additionally, sensors also may be used for detection of other sense impressions such as sound or temperature. For example, a microphone 440 may be connected to the game controller as an audio sensor. In a further implementation, a thermostat or touch sensor (not shown) may be used to detect the presence of a hand or finger on the playing surface 110.

In another implementation, the interactive game may include a tag writer to update the playing pieces based upon the latest game state.

A game controller (not shown) may be connected to the sensor 400 and the projector 140, the CRT 200, or the LCD 300, and may be configured to control or alter the game image. The game controller (not shown) may include a central processor unit (CPU) programmed and configured to use machine vision techniques for recognition of an image of the game state. The game controller (not shown) may alter the game state based on the recognized image of the game state. Since the playing pieces and playing surface may be recognized by the game controller (not shown). The game controller also may be configured to isolate a foreign object, such as a finger, in the field of vision of the digital camera and to produce a reaction such as varying the game image on the playing surface.

The game controller also may be configured to send a control signal to another device. For example, the game controller may send a control signal to a computer, to audio equipment, or to another toy. In a further implementation, the game controller and CPU may be configured as an artificial intelligence opponent of a human player.

The interactive game also may include speakers to produce sound and a light source to illuminate the playing pieces 120 and the playing surface 110.

Figure 5:
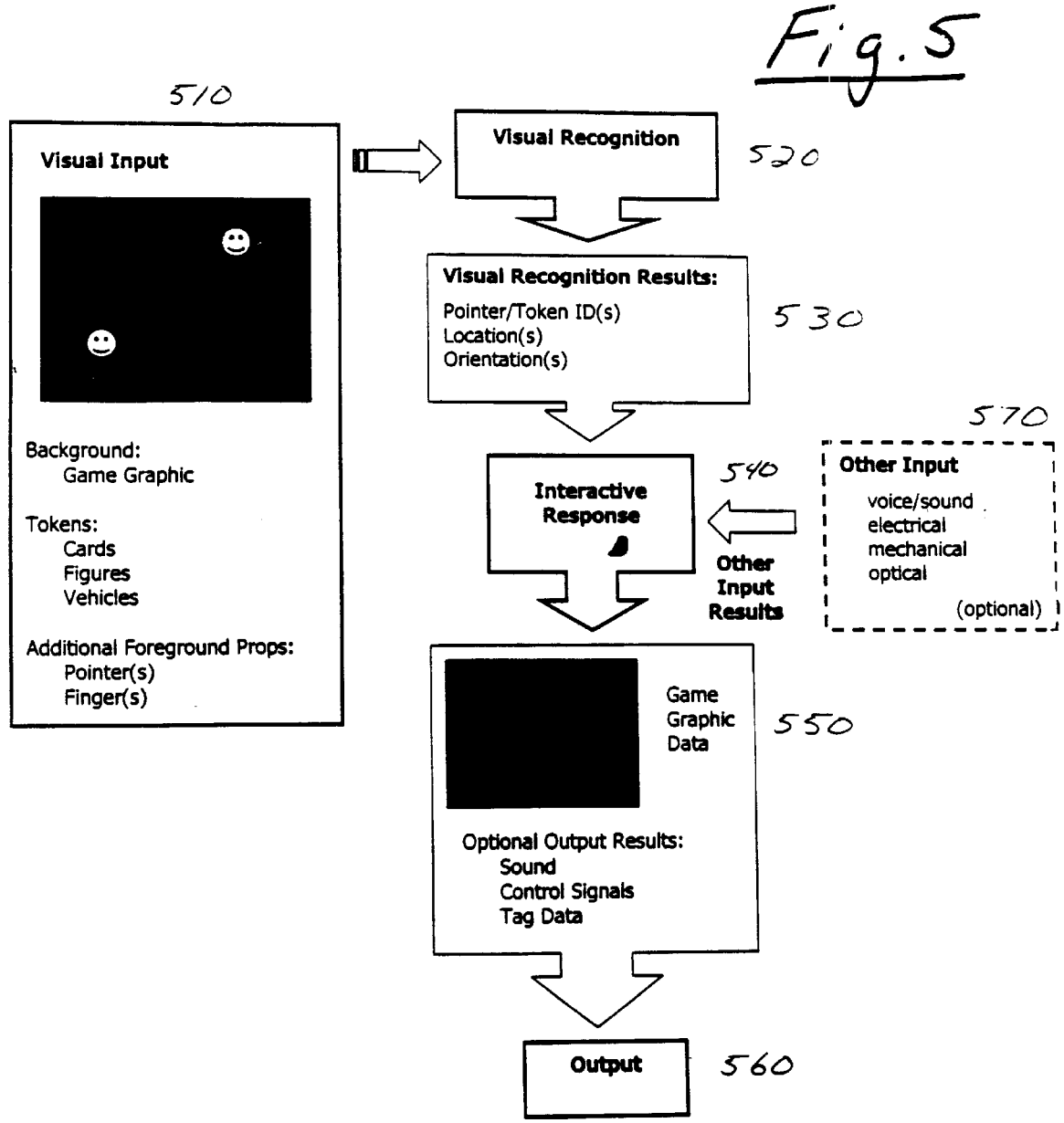
FIG. 5 is a block diagram of operations performed by an interactive game.

FIG. 5 shows a logical/functional block diagram of an interactive game 100 comprising visual input 510, visual recognition 520, visual recognition results 530, an interactive response 540, optional output results 550 and an output 560. The visual input 510 may include the playing surface 110 and playing pieces 120. Visual input 510 may also include foreign objects such as fingers.

Visual recognition 520 may be performed by comparing images of known playing pieces to the visual input 510. Visual recognition 520 may also include comparing images of known games states to the visual input 510.

Visual recognition results 530 may include storing information relative to the game state. The visual recognition results 530 may include information related to pointers and playing piece 120 identification, location and orientation relative to the playing surface 110.

The interactive response 540 may use the visual recognition results 530 to generate a response based on the game state. As shown in FIG. 5, the interactive response 540 may also incorporate other input 570, such as voice, sound, and other electrical, mechanical or optical information, to generate a response.

As shown in FIG. 5, optional output results 550 may use information generated by the interactive response 540 to produce optional output results such as sound, control signals and tag data. The output 560 may use the optional output results 550 in order to select and determine the appropriate output.

As shown in FIG. 6, playing an interactive game may include positioning a playing piece on a playing surface of an interactive game (step 610), detecting an image of the playing piece on the playing surface using an optical sensor (step 620), translating the image from the optical sensor into a signal using a game controller connected to the optical sensor and to a display (step 630), and creating a game image on the display in response to the signal (step 640). Additional steps may include changing the position of the playing piece on the playing surface (step 650), and altering the game image on the display based on the change of orientation of the playing piece (step 660).

Playing an interactive game also may include introducing a foreign object into a field of vision of the optical sensor, detecting the image of the foreign object, translating the image from the optical sensor into a second signal, and altering the game image on the display based on the second signal.

Other implementations are within the scope of the following claims.

What is claimed is:

1. An interactive game comprising:
   a playing surface defining playing positions;
   a display operable to display a visual game image on the playing surface;
   a sensor operable to optically detect a location or position of a playing piece placed on the playing surface; and
   a game controller connected to the sensor and the display, the game controller configured to create the visual game image and to alter the visual game image displayed on the playing surface in response to the location or orientation of the playing piece on the playing surface as detected by the sensor.

2. The interactive game of claim 1 wherein:
   the sensor is operable to optically detect a foreign object in a field of vision of the sensor; and
   the game controller is configured to alter the game image in response to the foreign object in the field of vision of the sensor.

3. The interactive game of claim 1 further comprising a frame secured to the playing surface.

4. The interactive game of claim 3 wherein the frame includes a table.

5. The interactive game of claim 1 wherein the playing piece comprises a plurality of playing pieces.

6. The interactive game of claim 5 wherein the playing pieces are of different types.

7. The interactive game of claim 6 wherein the playing pieces include playing cards.

8. The interactive game of claim 6 wherein the playing pieces include figurines.

9. The interactive game of claim 1 wherein the display comprises a projector.

10. The interactive game of claim 1 wherein the display comprises a cathode ray tube.

11. The interactive game of claim 1 wherein the display comprises a liquid crystal display.

12. The interactive game of claim 1 wherein the sensor comprises a digital camera.

13. The interactive game of claim 1 wherein the sensor comprises a laser.

14. The interactive game of claim 1 wherein the sensor comprises a bar code reader.

15. The interactive game of claim 1 wherein the sensor comprises a tag reader.

16. The interactive game of claim 1 further comprising an additional sensor configured to detect information other than a location or orientation of the playing piece.

17. The interactive game of claim 16 further comprising a writer connected to the game controller and operable to modify the playing piece in a way that is detectable by the additional sensor.

18. The interactive game of claim 17 wherein the writer comprises a tag writer.

19. The interactive game of claim 1 wherein the game controller is configured to use an optical character recognition system.

20. The interactive game of claim 1 wherein the game controller is configured to use machine vision technology.

21. The interactive game of claim 1 further comprising a speaker connected to the game controller wherein the game controller is configured to cause the speaker to emit sound in response to the location or orientation of the playing piece on the playing surface.

22. The interactive game of claim 1 further comprising a microphone connected to the game controller wherein the game controller is configured to cause the display to alter the game image in response to a sound.

23. The interactive game of claim 1 wherein the game controller is configured to send a control signal to another device in response to the location or orientation of the playing piece on the playing surface.

24. The interactive game of claim 1 wherein the game controller is configured to operate as an artificial intelligence opponent to a human player.

25. A method of controlling a display operable to display of a visual game image, the method comprising:

displaying a visual game image on a playing surface of an interactive game;

detecting a position or orientation of at least one playing piece on the playing surface using an optical sensor; and altering the visual game image displayed on the playing surface based, at least in part, on the position or orientation of the playing piece on the playing surface as detected by the optical sensor.

26. The method of claim 25 further comprising:

detecting a foreign object introduced into a field of vision of the optical sensor; and altering the visual game image displayed on the playing surface based, at least in part, on the detection of the foreign object.

27. The method of claim 25 wherein the playing piece includes a plurality of playing pieces such that detecting includes detecting the position or orientation of the plurality of playing pieces on the playing surface.

28. The method of claim 25 wherein the playing pieces are of different types such that detecting includes detecting the position or orientation of the different types of the playing pieces on the playing surface.

29. The method of claim 28 wherein the playing pieces include playing cards such that detecting includes detecting the position or orientation of the playing cards on the playing surface.

30. The method of claim 28 wherein the playing pieces include figurines such that detecting includes detecting the position or orientation of the figurines on the playing surface.

31. The method of claim 25 further comprising using a laser to detect a property of the playing piece.

32. The method of claim 25 further comprising using a bar code reader to detect a property of the playing piece.

33. The method of claim 25 further comprising using a tag reader to detect a property of the playing piece.

34. The method of claim 25 wherein the optical sensor comprises a digital camera such that detecting includes detecting the position or orientation of the playing piece on the playing surface using the digital camera.

35. The method of claim 25 wherein displaying includes displaying the visual game image on the playing surface using a projector.

36. The method of claim 25 wherein displaying includes displaying the visual game image on the playing surface using a cathode ray tube.

37. The method of claim 25 wherein displaying includes displaying the visual game image on the playing surface using a liquid crystal display.

38. The method of claim 25 further comprising generating a sound from a speaker based, at least in part, on the position or orientation of the playing piece on the playing surface as detected by the optical sensor.

39. The method of claim 25 further comprising:

receiving a sound input from a microphone, and altering the visual game image displayed on the playing surface based, at least in part, on the received sound input.

40. The method of claim 25 further comprising transmitting a control signal from a game controller to another device in response to the location or orientation of the playing piece on the playing surface.

41. The method of claim 25 further comprising playing the interactive game wherein a game controller is configured as an artificial intelligence opponent of a human player.

42. The method of claim 25 further comprising updating the playing piece in response to a game state.

43. The method of claim 42 further comprising updating the playing piece in response to the game state by using a tag writer.

* * * * *